_United States Patent_ [19]

Pearson et al.

[11] 4,172,175

[45] Oct. 23, 1979

[54] POLE CONSTRUCTION

[75] Inventors: Everett A. Pearson, Warren; Henry C. Buffington, Cranston, both of R.I.

[73] Assignee: Tillotson-Pearson, Inc., Warren, R.I.

[21] Appl. No.: 878,946

[22] Filed: Feb. 17, 1978

[51] Int. Cl.² .............................................. D02G 3/00
[52] U.S. Cl. .................................... 428/376; 156/175; 156/180; 273/DIG. 7; 273/DIG. 23; 428/377; 428/398
[58] Field of Search ............... 428/377, 376, 364, 365, 428/398; 156/172, 175, 180; 273/DIG. 7, DIG. 23

[56] References Cited

U.S. PATENT DOCUMENTS

| | | | |
|---|---|---|---|
| 2,594,693 | 4/1952 | Smith | 273/DIG. 7 |
| 2,929,409 | 3/1960 | Waehner | 273/DIG. 7 |
| 3,281,299 | 10/1966 | Shobert | 156/175 |
| 3,429,758 | 2/1969 | Young | 428/310 X |
| 3,491,999 | 1/1970 | Lindler | 273/80 B |
| 3,574,104 | 4/1971 | Medler | 428/377 X |
| 3,896,858 | 7/1975 | Whatley | 428/398 |
| 3,929,543 | 12/1975 | Scott et al. | 156/172 X |
| 3,974,012 | 8/1976 | Hogarth | 273/DIG. 23 X |

_Primary Examiner_—Lorraine T. Kendell
_Attorney, Agent, or Firm_—Salter & Michaelson

[57] ABSTRACT

This invention is directed to a novel fiberglass pole construction and the method for forming such. The pole is of composite construction and includes inner, outer and intermediate layers resin bonded together into an integral hollow elongated tapered form exhibiting lightweight and high strength characteristics. The intermediate layer includes individual sublayers in turn formed from a plurality of strips of non-woven, unidirectional glass fiber fabric. The strips of each sublayer are circumferentially staggered about the periphery of the pole and are disposed lengthwise therealong so that the orientation of the glass fibers forming such strips is parallel to the longitudinal axis of the pole. Several such sublayers are built up until the necessary strength characteristics have been imparted to the pole. An outer layer of generally spirally wrapped ribbon essentially completes the structure.

8 Claims, 16 Drawing Figures

POLE CONSTRUCTION

BACKGROUND AND SUMMARY OF THE INVENTION

This invention relates to fiberglass utility poles such as may be used in the mounting of luminaires, signs and the like, and particularly to a novel construction thereof and the method of forming such pole construction. Fiberglass pole constructions in which various layers of fiberglass are covered or otherwise filled with curable plastic resin overlayed or wrapped around one another are know. Poles constructed in this manner may be used in place of wooden, aluminum or steel poles and offer considerable advantages thereover including lower weight, easier installation, lower cost, vibration dampening and greater life expectancy. Such poles also by their nature are resistive to rain, wind, salt and other chemical sprays, exposure to the sun and may be directly implanted in the soil without need of preservative impregnation or any special protective covering. Of course, if it is not desired to implant the fiberglass pole, it may be mounted above ground simply by using conventional supports to facilitate such.

An example of such a fiberglass pole construction is shown in U.S. Pat. No. 3,896,858 issued July 29, 1975. In such regard the above patent citation and discussion constitutes applicant's Prior Art Statement and accordingly a copy of such patent is enclosed with the instant application.

Despite the existence of fiberglass poles of the above-indicated type, it would be desirable to be able to provide fiberglass pole constructions having increased resistance to bending and deflection when mounted. It would also be desirable to have such a pole in which areas thereof have particular strength characteristics built therein so as to better facilitate the mounting of signs, luminaires and the like. Accordingly, a primary object of the present invention is the provision of a fiberglass pole construction in which the strength characteristics thereof and particularly its resistance to deflection, when mounted, can be tailor made for particular end use applications.

A further object of the present invention is the provision of a fiberglass utility pole of the above-indicated type in which there are component layers arranged with respect to each other and with regard to the pole axis so as to contribute to such desired strength characteristics.

A further object of the present invention is the provision of a novel method of forming the pole construction of the subject invention such that the pole may be readily formed in an efficient and low-cost manner.

These and other objects of the present invention are accomplished by the provision of an elongated, hollow tapered pole of composite structure having integrally resin bonded inner, outer and intermediate layers wherein the inner and outer layers are generally spirally laid wraps of substantially resin impregnated glass fiber ribbon extending the entire length of the pole with the intermediate layer disposed therebetween, said intermediate layer including a plurality of resin bonded sublayers, each of said sublayers including separate strips of unidirectional glass fibers, each aligned parallel to the longitudinal axis of the pole. Additionally the intermediate sublayers are longitudinally staggered with respect to each other such that all of the strips do not extend the entire length of the pole such that those areas having a greater number of sublayers will accordingly be strengthened in accordance with the teachings of the present invention.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

Description of the Invention

Figure 1:
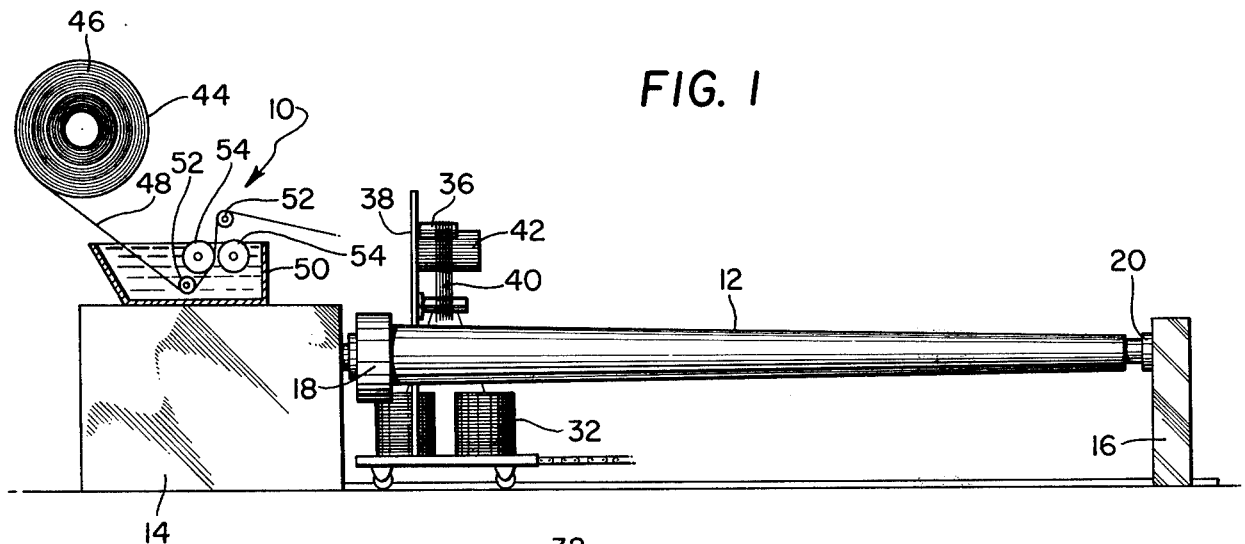
FIG. 1 is an elevational view of an apparatus by which the novel pole construction of the present invention may be formed and further illustrating the novel method of forming such.
Figure 2:
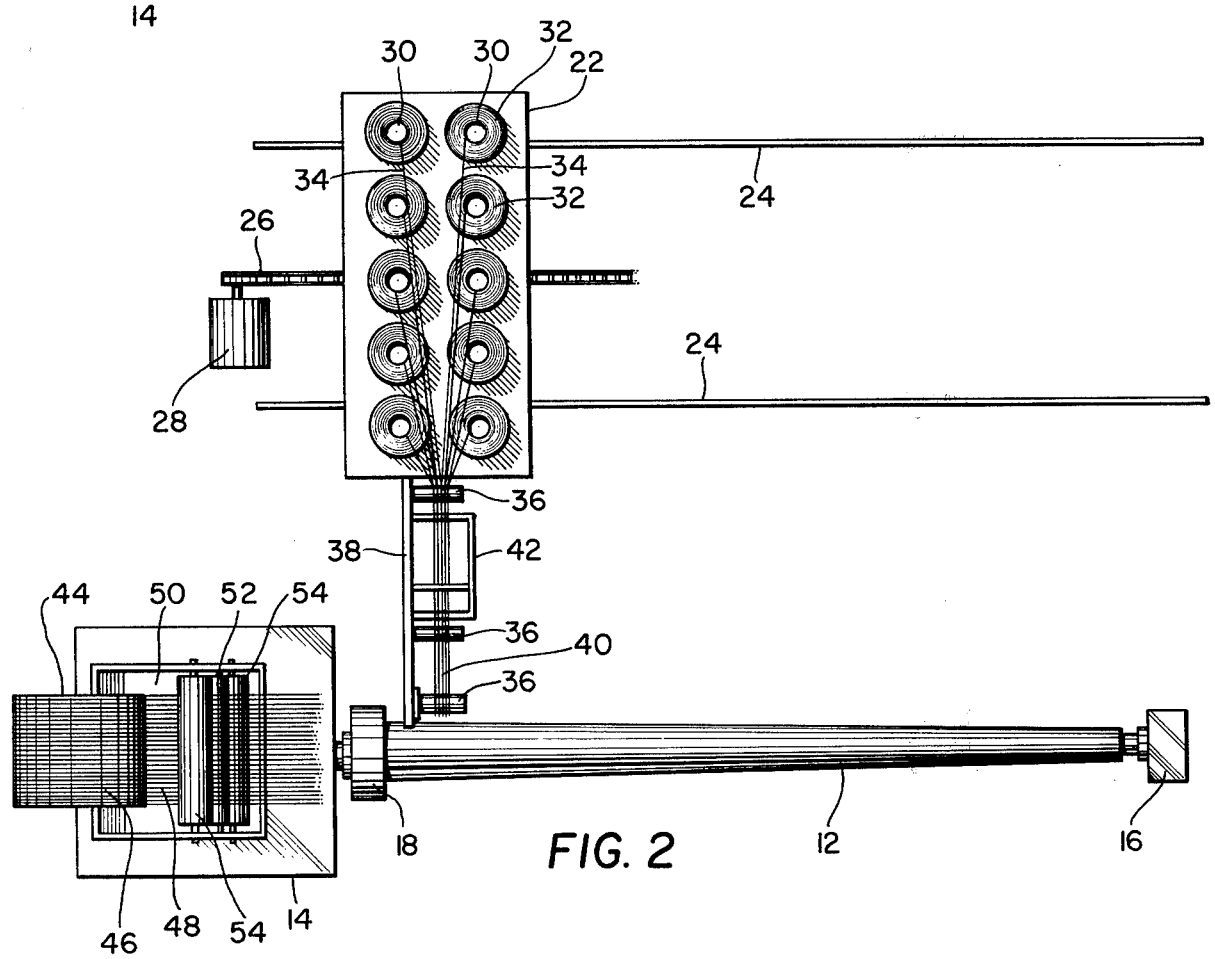
FIG. 2 is a plan view of the apparatus shown in FIG. 1.
Figure 3:
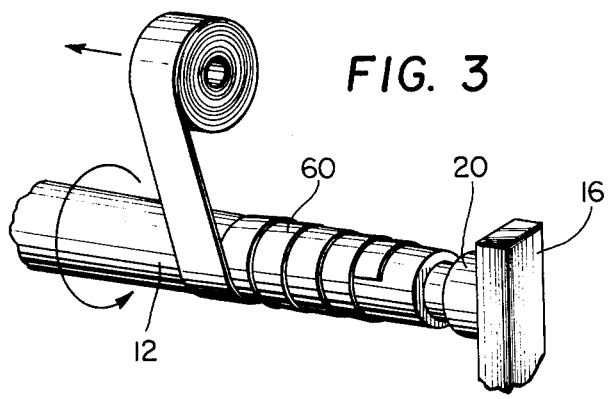
FIG. 3 illustrates an initial step in the process of forming the pole of the present construction.
Figure 4:
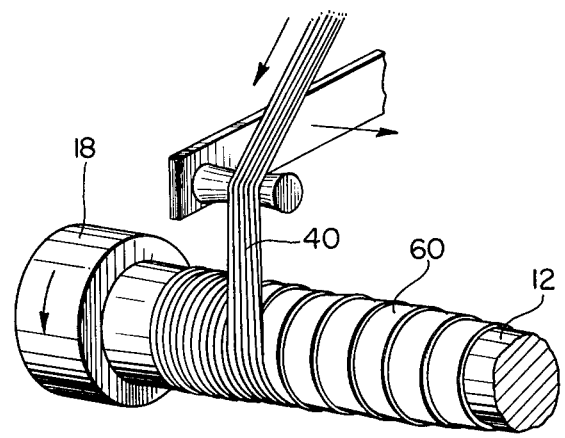
FIG. 4 is a later step in such process.

Turning now to the drawings and particularly FIGS. 1 and 2 thereof, the apparatus 10 for forming the utility pole of the present invention is shown. Therein a mandrel 12 upon which the pole is constructed, is mounted between base and tip supports 14, 16 respectively. The mandrel which may be constructed of aluminum or other machinable material, includes a smooth outer surface and is normally of a longitudinal extent considerably greater than that of the pole to be formed thereon. The mandrel is mounted for rotation between the supports 14, 16. The support 14 includes means (not shown) for both rotating the mandrel 12 as well as rotationally indexing it at different arcuate positions for a purpose which will hereinafter be more fully apparent. The base of the mandrel is received in a chuck 18 of conventional construction which in turn is operationally connected to the rotational means of the support 14 as by an appropriate gear train (not shown). The opposite end or tip of the mandrel is slidably received in a collar 20 outwardly extending from the support 16. The collar 20 accordingly supports the tip end of the mandrel and permits its rotation with respect to the support 16.

A traveling creel 22 is laterally offset from the position of the mounted mandrel. The creel 22 is movable on spaced tracks 24 parallel to the longitudinal rotational axis of the mandrel 12 as through a chain drive 26 in turn connected to a motor 28. The motor may be operationally controlled from the base support 14 so as to coordinate the longitudinal travel of the creel 22 with the rotation of the mandrel. The creel includes a plurality of upright package supports 30, each of which is capable of receiving a package 32 of wound glass fibers 34. The individual fibers or strands 34 are directed side to side as a group over a plurality of pins 36 of a first station 38 and thereafter into contact with the rotating mandrel such that the individual strands 34 are withdrawn by an unwinding action from the packages 32 thereof and formed into a ribbon 40 of generally parallel disposed strands. The strands may be Type 30 continuous approximately one-inch glass fiber strand which when assembled in the form of ribbon 40 will be several inches in width. The ribbon as it is formed, is passed through a reservoir 42 forming a part of station 38 and containing a liquid curable resin such as commercially available polyester resin. In this way then, the ribbon 40 is coated, impregnated or otherwise provided with a buildup of uncured resin thereon.

The upper surface of the base support 14 is provided with a second station or mechanism 44 which includes a support (not shown) for a roll 46 of nonwoven, unidirectional glass fiber fabric 48 and a reservoir 50 through which the fabric 48 may pass so as to be resin coated prior to its application to the mandrel 12 as will hereinafter be more fully explained. Appropriate guide rolls 52 as well as squeeze rollers 54 serve to move the fabric 48 through the reservoir 50 in such a fashion that the desired amount of uncured resin is applied thereto. Cutting means (not shown) may also be associated with the second station 44 such that strips of the fabric 48 may be cut prior to application to the mandrel. Such fabric includes individual strands of fiberglass disposed parallel to each other and held in such disposition by means of thin lateral bands 56 of a fused polymeric material such as polyethylene which has a lower melting point than the glass fibers.

Figure 7:
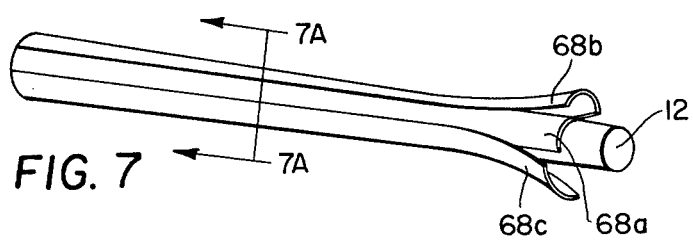
FIG. 7 is a still further process step in the present invention.
Figure 7A:
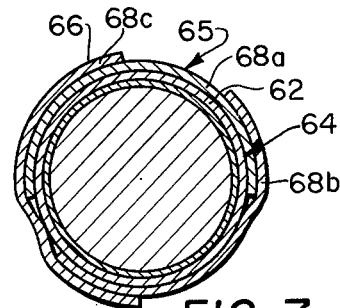
FIG. 7a is a cross section taken along the line 7a—7a of FIG. 7.
Figure 8:
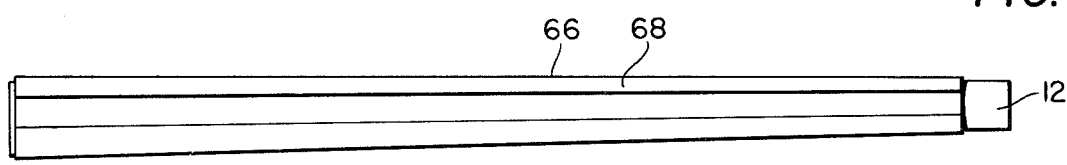
FIG. 8 is an elevational view showing an intermediate stage in the pole construction as shown in FIG. 7.
Figure 9:
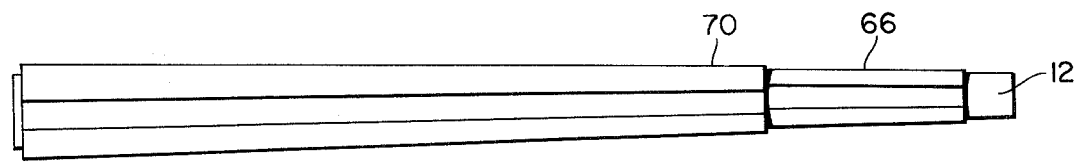
FIG. 9 is an elevational view showing a still further intermediate stage in the formation of the pole from that shown in FIG. 8.
Figure 10:
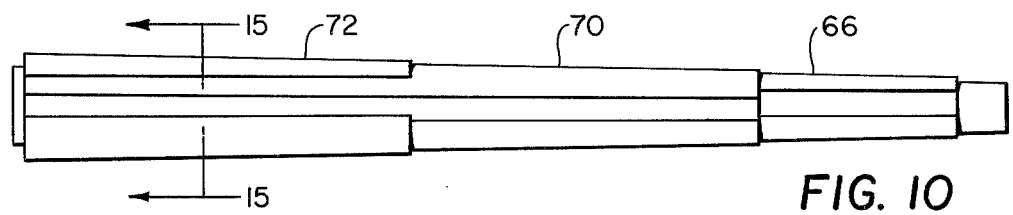
FIG. 10 is an elevational view showing a still further constructional stage of the pole from that shown in FIG. 9.
Figure 11:
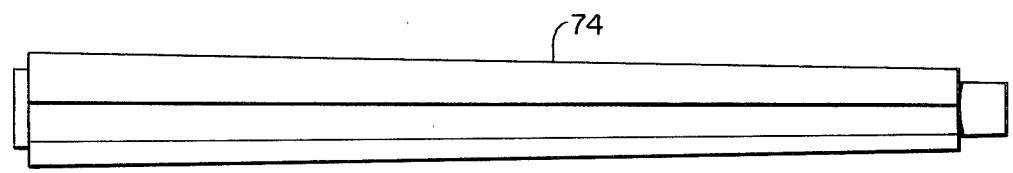
FIG. 11 is an elevational view showing a still further stage of the pole construction from that shown in FIG. 10.
Figure 12:
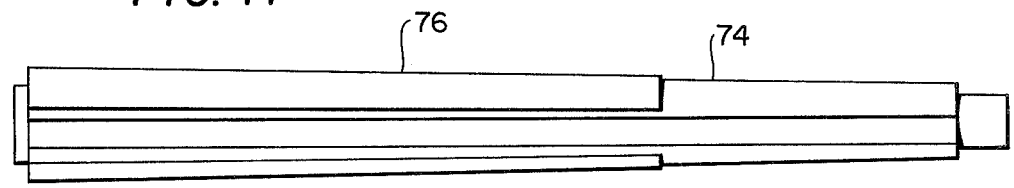
FIG. 12 is an elevational view showing a still further stage of the pole construction from that shown in FIG. 11.
Figure 13:
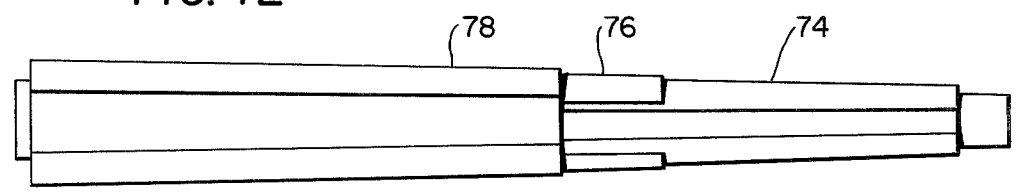
FIG. 13 is an elevational view showing a still further constructional stage of the pole from that shown in FIG. 12.
Figure 14:
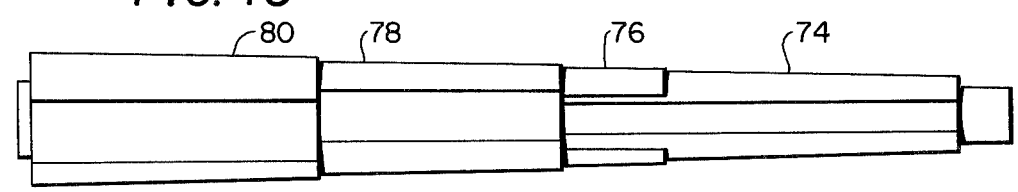
FIG. 14 is an elevational view showing a still further constructional stage of the pole shown in FIG. 13.
Figure 15:
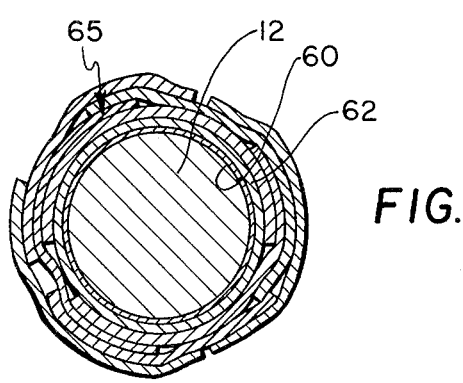
FIG. 15 is a cross sectional view taken along the line 15—15 of FIG. 10.

In operation, the outer surface of the mandrel 12 is initially provided with a release material such that the subsequent layers of fiberglass and resin laid up thereon in the construction of the pole will not adhere thereto. Such release material may be a spirally wound layer of cellophane 60, hand or otherwise applied to the outer surface of the mandrel after the latter has been coated with a wax-like material, by the movement of a cellophane roll along the mandrel while the mandrel is rotated. Thereafter an initial or inner layer 62 of the pole is formed by the application to the cellophane covered mandrel of a spirally wound layer or layers of the ribbon 40. Thereafter and while the resin component of the layer 62 is still essentially completely uncured, a second or intermediate layer 65 of the finished pole construction is applied thereto in the form of a plurality of sublayers, one sublayer 66 being shown in FIGS. 7, 7a and 8. In order to form the initial sublayer 66, strips 68 of the fabric 48 are cut to length and applied over the initial layer 62 such that the individual fibers of such fabric 48 are disposed parallel to the longitudinal axis of the mandrel 12 and such that the strips 68 are parallel to each other. Also, at least to some extent, adjacent strips 68 have laterally overlapping longitudinally extending edge portions. Such configuration is best shown in the sequence from FIGS. 5 through 8 wherein an initial strip 68a is shown being placed upon the inner layer 62 in FIG. 5. Such strip 68a is then smoothed so as to insure the accurate parallel alignment of the fibers of such strip with that of the longitudinal axis of the mandrel. The strip has been coated with uncured resin as a result of having passed through reservoir 50. Thereafter a second and a third strip, 68b and 68c respectively, are similarly overlapped and smoothed so as to form the initial sublayer 66. Preferably, the length of such initial sublayer 66 is at least the length of the finished pole such that it runs the entire extent thereof. It also should be brought out that each of the individual strips 68a, 68b, and 68c are arcuately displaced from one another, that is, that the mandrel is rotationally shifted between the application of each successive strip such that the strips forming the sublayers 66 are arcuately offset from one another and have longitudinally extending edge portions which laterally overlap each other.

Turning now to FIGS. 9 through 15 of the drawings, it should be pointed out that successive additional sublayers 70, 72, 74, 76, 78 and 80 may be applied to the already formed sublayer 66 and that such additional sublayers may or may not extend the entire length of the finished pole construction dependent on where in the finished pole construction particular strength levels are necessary due to engineering requirements. In that regard, because of the parallel orientation of the fibers in the sublayers of the intermediate layers 65 with that of the longitudinal axis of the finished pole construction, particular resistance of the pole against deflection when placed in a use position is achieved. Also, if it is desired to build up additional extensive resistance to deflection in base portions of the pole, than a greater number of sublayers are disposed in such base position such as shown in the specific example set forth in FIGS. 9 through 15. Alternatively or additionally, sublayers may be applied in any particular location such as for example: proximate to the tip end of the finished pole construction where brackets for the mounting of lights, signs, etc. may be required. Thereafter the outer layer formed in the manner of the inner layer 62 is applied. Thus, it may be seen that the strength characteristics of the finished pole construction may be tailor made for particular use applications without the necessity of gaining needed strength characteristics by the overall enlargement of the pole thickness throughout its entire extent.

Figure 5:
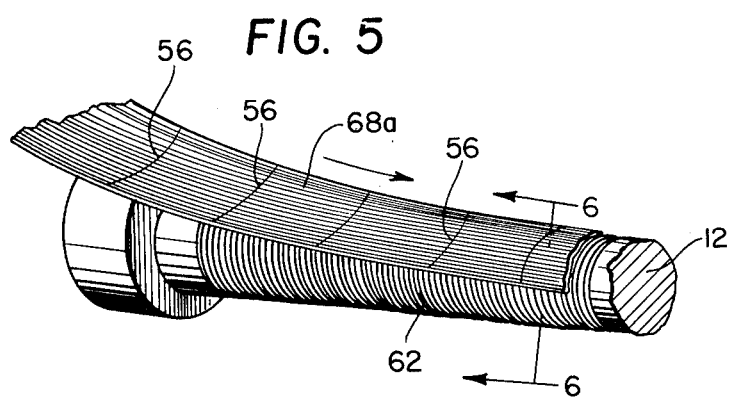
FIG. 5 is still a further step in such process.
Figure 6:
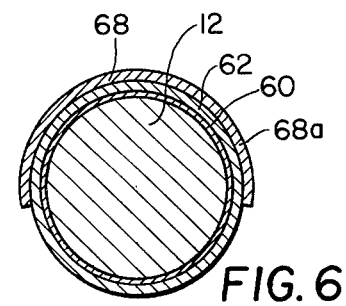
FIG. 6 is a cross sectional view taken along the line 6—6 of FIG. 5.

In the specific example of the invention shown in the drawing, a 23-foot mandrel with a $5\frac{1}{2}$ inch diameter base portion is utilized. The outer surface of the mandrel 12 is waxed and cellophane wrap applied as indicated from the tip thereof to the base for a total distance of at least 19 feet so as to provide for a total 18-foot utility pole. The inner layer 62 is applied as indicated for a length of 19 feet. Thereafter, one sublayer of the intermediate layer 65 in the form of three strips of 8-inch width by 19-foot length fabric 48 are applied sequentially to the mandrel at 0, 135, and 270 degree positions respectively. Intermediate such application of the strips, the mandrel is indexed such that the strips are always applied in the upper position as shown in FIG. 5. Thereafter, sublayer 70 composed of three strips of 8-inch wide by 15-foot length fabric is applied at 45, 180 and 315 degree positions of the mandrel. Thereafter sublayer 72 is applied and comprises two fabric strips 8-inch wide by 8-feet long disposed in the 90 and 215 degree mandrel position; thereafter sublayer 74 comprising three 8-inch by 19-foot strips are applied at the 0, 135 and 270 degree mandrel positions, thereafter sublayer 76 comprising two 8-inch by 13-foot strips are applied at the 180 and 315 degree positions of the mandrel; thereafter sublayer 78 comprising three 8-inch by 11-foot strips are applied to the then outermost sublayer at 45, 90 and 215 degree mandrel positions; thereafter sublayer 80 comprising three 8-inch by 6-foot strips are applied to the then outermost adjacent sublayer at the 60, 200, and 330 degree positions of the mandrel; and finally the outer layer (not shown) is applied to the outer surface of the intermediate layer 65 by spirally wrapping the ribbon 40 a distance of 19 feet from the tip to the base of the mandrel. The resultant buildup is then permitted to cure at ambient temperatures. After curing, the mandrel is forcibly withdrawn from the resultant pole structure by known techniques. The pole structure is then cut to size, provided with an outer coating of pigmented polyester resin which upon curing and surface preparation as by sanding is painted with a specially formulated polyurethane paint.

It should be pointed out that variations in the length, size and number of the strips forming the several sublayers 68 of the intermediate layer 65 as well as the number of sublayers, can be made and that the specific manner as outlined above, although resulting in a final pole construction having the desired features and characteristics sought in this invention, may be changed so as to arrive at a different strength characteristic as needed for various end use application. In all cases, however, the inner and outer layers serve to sandwich the intermediate layer therebetween and to absolutely insure that the fibers that make up the intermediate layer extend parallel to the longitudinal axis of the pole. Furthermore, the individual strips forming the various sublayers of the intermediate layer 65 may be placed under tensional stress during the lay up application as well as during the cure thereof so as to maximize straightening of the fibers, such that the strength and resistance to deflection of the resultant pole is increased. The amount of tension required is determined by the force necessary to effectively straighten the ribbon so that its fibers extend in a true longitudinal direction.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An elongated hollow tapered pole for use in mounting luminaries and signs comprising, a composite structure having integrally resin bonded inner, outer and intermediate layers, said inner layer being a generally spirally laid wrap of substantially resin impregnated glass fiber ribbon extending the entire length of said pole, said intermediate layer disposed above and completely covering said inner layer and comprises a plurality of resin bonded sublayers, each of said sublayers comprises a separate strip of unidirectional glass fibers with each of said strips parallel to the longitudinal axis of said pole and progressively built up upon the outer surface of an underlying layer portion, said sublayers longitudinally staggered with respect to each other, and said outer layer being a generally spiral laid wrap of substantially resin impregnated glass fiber ribbon extending the entire length of said pole so as to enclose said intermediate layer between said inner and outer layers, at least one of said sublayers substantially extending the entire length of said pole and said strips at least partially laterally overlapping each other along their longitudinally extending edges, said pole being of a generally circular cross section, said strips being of a lateral extent less than that necessary to circumferentially enclose the underlying layer portion, and the longitudinal center lines of the strips of individual sublayers being staggered with respect to the center lines of the strips of adjacent sublayers.

2. The pole construction of claim 1, wherein said at least one sublayer which extends the entire length of the pole being that sublayer immediately adjacent said inner layer.

3. The pole construction of claim 1, wherein said intermediate layer comprises the major component of said pole and provides the primary resistance to lateral pole deflection.

4. The pole construction of claim 1, wherein at least some of the strips of said sublayers being under tension so as to additionally strengthen said pole.

5. The pole construction of claim 1, wherein said resin is a polyester resin.

6. The pole construction of claim 1, wherein said strips comprise transversely extending longitudinally spaced glass fiber strand connecting bands formed of a resin material having a substantially lower melting point than the glass fibers in such strips, said bands being connected to said glass fibers at their points of mutual contact so as to maintain a parallel spacing of said glass fibers.

7. The pole construction of claim 6, wherein said bands are formed of polyethylene.

8. The pole construction of claim 1, wherein each of said sublayers comprise three generally equal width strips, said strips disposed about the underlying layer with their longitudinal centerlines generally equally spaced apart from each other.

* * * * *